United States Patent
Yen

(10) Patent No.: US 8,143,561 B2
(45) Date of Patent: Mar. 27, 2012

(54) MEMS SCAN CONTROLLER GENERATING CLOCK FREQUENCY AND CONTROL METHOD THEREOF

(75) Inventor: Wei-Shin Yen, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/254,564

(22) Filed: Oct. 20, 2008

(65) Prior Publication Data

US 2011/0127404 A1  Jun. 2, 2011

(30) Foreign Application Priority Data

Dec. 31, 2007  (TW) ................................ 96151608 A

(51) Int. Cl.
*G01J 1/16* (2006.01)
*G02B 26/10* (2006.01)

(52) U.S. Cl. ................................ 250/201.1; 359/199.1

(58) Field of Classification Search ................ 250/201.1, 250/230, 234, 235; 359/197.1–199.1, 223.1–226.1, 359/871, 872

See application file for complete search history.

(56) References Cited

U.S. PATENT DOCUMENTS

| | | | | |
|---|---|---|---|---|
| 5,121,138 A * | 6/1992 | Schermer et al. | ............. | 347/250 |
| 5,408,352 A * | 4/1995 | Peng | ........................... | 359/203.1 |
| 5,867,297 A * | 2/1999 | Kiang et al. | ............... | 359/198.1 |
| 6,838,661 B2 * | 1/2005 | Klement | ........................ | 250/234 |
| 6,870,560 B2 * | 3/2005 | Bush et al. | ..................... | 347/259 |
| 6,891,572 B2 * | 5/2005 | Ueki | ............................ | 348/458 |
| 6,947,189 B2 * | 9/2005 | Hagelin et al. | ............. | 359/201.1 |
| 6,987,595 B2 * | 1/2006 | Bush et al. | ................. | 359/213.1 |
| 7,030,708 B2 * | 4/2006 | Klement | ........................ | 331/154 |
| 7,190,499 B2 * | 3/2007 | Deng et al. | ................. | 359/206.1 |
| 7,304,411 B2 * | 12/2007 | Klement et al. | .............. | 310/311 |
| 7,924,486 B2 * | 4/2011 | Yen et al. | .................... | 359/199.1 |
| 2004/0119002 A1 * | 6/2004 | Bush et al. | ..................... | 250/234 |
| 2005/0139678 A1 * | 6/2005 | Helsel et al. | ............. | 235/462.37 |
| 2005/0280879 A1 * | 12/2005 | Gibson et al. | ................. | 358/474 |
| 2006/0117854 A1 * | 6/2006 | Turner | ........................... | 73/579 |
| 2006/0139113 A1 * | 6/2006 | Menke | .......................... | 331/167 |
| 2006/0279364 A1 * | 12/2006 | Klement | ........................ | 331/16 |
| 2007/0041068 A1 * | 2/2007 | Heminger et al. | ............. | 359/199 |
| 2007/0063134 A1 * | 3/2007 | Wine et al. | .................... | 250/235 |
| 2011/0127404 A1 * | 6/2011 | Yen | ............................ | 250/201.1 |

* cited by examiner

*Primary Examiner* — John Lee
(74) *Attorney, Agent, or Firm* — Muncy, Geissler, Olds & Lowe, PLLC

(57) ABSTRACT

A Micro Electronic Mechanical System (MEMS) scan controller generating clock frequency and a control method thereof are disclosed. The MEMS scan controller is for a MEMS mirror in a bi-direction laser scanning units (LSU). By detecting resonant frequency of the MEMS mirror, the scan controller sends frequency modulation signal and amplitude modulation signal of the MEMS mirror to a bridge circuit of the MEMS mirror for adjusting and stabilizing the MEMS mirror. A clock signal corresponding to the resonant frequency of the MEMS mirror at the moment is also sent so that scan data is sent within the effective scanning window in forward direction/reverse direction. Thus high-precision scanning is achieved.

9 Claims, 11 Drawing Sheets

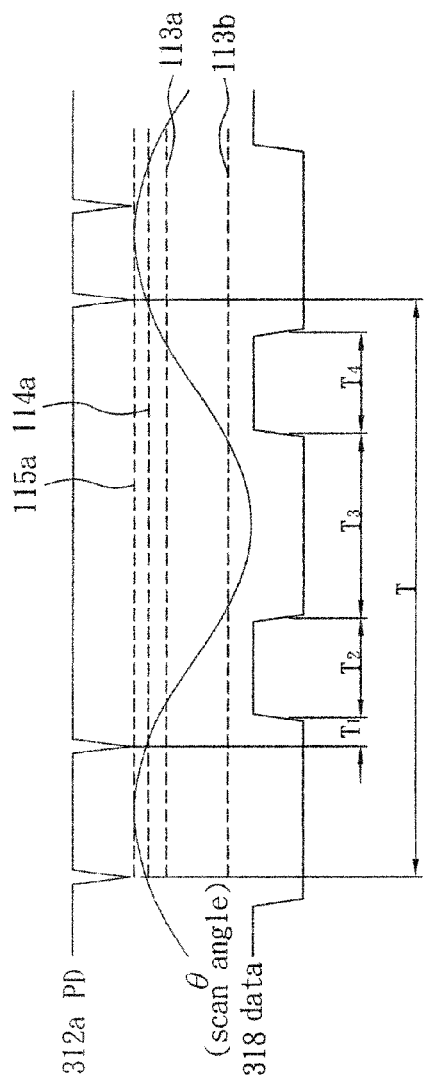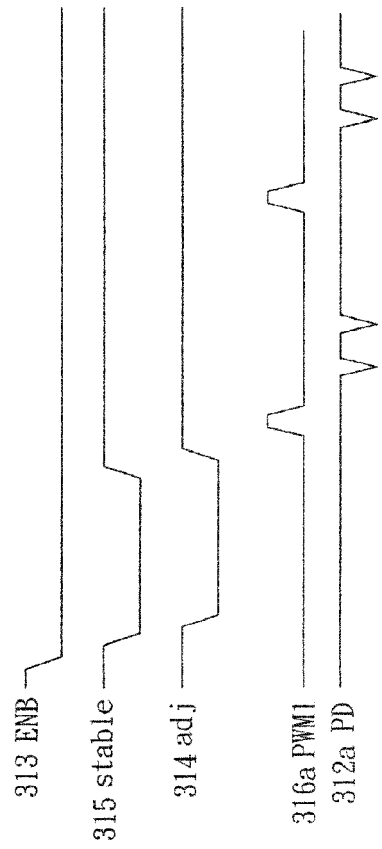
FIG. 4
FIG. 5

MEMS SCAN CONTROLLER GENERATING CLOCK FREQUENCY AND CONTROL METHOD THEREOF

BACKGROUND OF THE INVENTION

The present invention relates to a Micro-electronic-mechanical System (MEMS) scan controller generating clock frequency and a control method thereof, especially to a controller for micro-electric-mechanical mirrors (MEMS mirror) applied to bi-direction laser scanning units (LSU) and a control method that generate clock frequency signals so as to make a laser light source transmit laser beams within an effective scanning window according to the clock frequency signals.

Most of LSU available now uses a polygonal mirror rotating at high speed to control reflection direction of laser beam. However, due to hydraulic driving, working rotational speed limits, high manufacturing cost, high noises and delayed initiation, such LSU is unable to meet requirements of high speed and high precision by using polygon mirror. In recent years, MEMS mirrors with torsion oscillators are getting known and are going to be applied to LSU of imaging systems, scanners or laser printers in future. The MEMS oscillatory mirror developed based on principle of torsion oscillators has higher scanning efficiency than conventional polygon mirror.

In a laser scanning unit (LSU), a Micro Electronic Mechanical System (MEMS) oscillating mirror mainly consists of a control board with bridge circuit, a torsion oscillator and a mirror. A mirror driven by resonance magnetic field symmetrically oscillates along an axis. When a laser light is emitted to the mirror of the MEMS mirror, the MEMS oscillating mirror reflects the incident laser beam to the axis of the MEMS mirror at different angles for scanning along with different reflecting angles of the mirror surface that changes with time. Since the MEMS mirror scanning approach can neglect the wavelength effects, that the MEMS mirror has features of high resolution and large rotation angle so that has been applied broadly to commercial products, science and industries, such as devices disclosed in U.S. Pat. Nos. 5,408352, 5,867,297, 6,947,189, 7,190,499, TW Patent M253133 and JP 2006-201350. In order to improve scanning efficiency, a bi-directional LSU is developed yet associated control difficulties are raised.

Due to resonant oscillation of the MEMS mirror, the rotation angles and stability of the MEMS have effects on precision of the LSU. In a controller for bi-directional LSU of the MEMS mirror, conventional technique focuses on stability control of the MEMS mirror such as adjustment of resonant frequency, working angle, or by means of a voltage controlled oscillator (VCO) to control the frequency. The frequency control of the VOC is based on changing permittivity of dielectric material by current or change of the capacitance by the voltage, as shown in US2006/00139113, US2005/0139678, US2007/0041068, US2004/0119002, U.S. Pat. Nos. 7,304,411, 5,121,138, and JP63-314965. Take a bi-directional LSU with 600 dots-per-inch (dpi) resolution per A4 size as an example, 5102 light spots are sent per each scanning in one directional. The 5102 light spots are sent completely during an imaging interval while the imaging interval should be invariant with the frequency or amplitude variations of the MEMS mirror that lead to deviation of the light spot and the image is not formed on the object. Thus the calculation frequency of the MEMS mirror for sending correct signal to the laser controller that emits laser light is a main point of control. Refer to US2006/0279364, a method for determining an operating point of an oscillation controller is disclosed. A table derived from a model built by the method is used to define the operating point. The operating point may be expressed in terms of clock counts by factoring in the clock rate of the oscillation controller. Refer to U.S. Pat. No. 6,891,572, an interpolation circuit writes a video signal into a frame memory in synchronism with the write system clock from the PLL circuit. Refer to U.S. Pat. No. 6,838,661, a torsion oscillator is stabilized in operation by a PD detector. Refer to U.S. Pat. No. 6,870,560 and U.S. Pat. No. 6,987,595, rotation of drum and laser scan frequency are controlled by a counter controller or dynamic adjustment of resonant frequency. As to bi-directional scanning, in order to let the scanning beam not deviated and an image is formed on the object within the scanning window, a more fast and effective method is required.

SUMMARY OF THE INVENTION

Therefore it is a primary object of the present invention to provide a MEMS scan controller applied to bi-direction laser scanning units (LSU). The MEMS scan controller is for detecting resonant frequency and amplitude of the MEMS mirror so as to generate signals to laser controllers and control bridge circuit of the MEMS mirror for adjusting resonant frequency and amplitude of the MEMS mirror and stabilizing the oscillation of the MEMS mirror. Thus the laser beam can perform scanning precisely and correctly within effective scanning window.

As to the MEMS LSU, the laser light source is controlled by the laser controller. When the laser controller sends out the scanning data, the laser light source emits laser light toward the MEMS mirror that oscillates in resonant frequency f. Thus the laser light scans within effective scanning area being called as scanning window. After scanning, the laser light becomes scanning beams that pass the scanning lens to form images on the object. As to the scanning beams outside the scanning window, it is detected by a photoelectric detector (PD detector), the PD detector is excited to send a signal to the said controller and the MEMS scan controller. The MEMS mirror is controlled by the bridge circuit. When the MEMS mirror oscillates over a normal range, the MEMS oscillation of the MEMS mirror should be reduced by the bridge circuit. On the other hand, when the MEMS oscillation is getting weaker, the MEMS oscillation should be increased by the bridge circuit. When oscillation of the MEMS mirror becomes stable, a clock signal is sent to the laser controller of the printer or the multi-function printer for informing the timing and the frequency of scanning data.

The clock signal is derived according to the frequency and amplitude of the MEMS mirror. Within the effective scanning window, a number of β or nβ beam spots are generated. Example to 600 dots-per-inch (dpi) resolution per A4 size, β is set as 5102 in one line. There are 5102 beam spots generated within the effective scanning window.

The MEMS scan controller of the present invention comprises a control logic (logic unit), at least one D inverter, a phase locked loop and a counter comparator. The control logic receives triggering PD signals from the PD detector and calculates interval of each PD signal to generate frequency modulation signals and amplitude modulation signals. The phase locked loop generates clock signals. The frequency of the clock signal is $f_{CLK}(t)$, corresponding to the scanning frequency of the MEMS mirror at time t. Thus, when the laser controller receives the clock signal from the phase locked loop, the scan data is sent.

The MEMS mirror oscillates in frequency f, a complete cycle period from the left side to the right side is T and the scanning angle is θ. The relationship between the scanning angle θ and time t is a sinusoid. Refer to FIG. 2, in order to prevent scanning deformation, within a cycle period T, two periods of time a~b and a'~b' during which the curve is most close to linearity are selected. Refer to FIG. 4, $T_2$ and $T_4$ respectively are time of the forward scanning and time of the reverse scanning, in which the curve is the most close to linearity. The relationship among $T_1, T_2, T_3, T_4$ is as following:

$$T_1 = \sin^{-1}\left(\frac{\theta_p}{\theta_c}\right) \cdot \frac{1}{2\pi f} - \sin^{-1}\left(\frac{\theta_n}{\theta_c}\right) \cdot \frac{1}{2\pi f} \quad (1)$$

$$T_2 = 2\sin^{-1}\left(\frac{\theta_n}{\theta_c}\right) \cdot \frac{1}{2\pi f} \quad (2)$$

$$T_3 = \frac{1}{2}(T - 2T_2) \quad (3)$$

$$T_4 = T_2 \quad (4)$$

wherein $T_1$ is delay time, $T_2$ is time of the forward scanning, $T_3$ is delay time, $T_4$ is time of the reverse scanning, f is resonant frequency of the MEMS mirror, $\theta_c$ is scanning angle of the MEMS mirror, $2\theta_p$ is the angle of the PD detector, and $2\theta_n$ is an effective scanning window formed by effective scanning angle.

It is another object of the present invention to provide a MEMS scan controller that simultaneously sends a data trigger signal while sending a clock signal with frequency of $f_{CLK}(t)$ for driving the laser controller to start sending scan data. Thus the transmission of scan data is more precisely.

It is a further object of the present invention to provide a control method of the MEMS LSU that stabilizes oscillation of the MEMS mirror by control of resonant frequency and amplitude of the MEMS mirror. Moreover, the frequency $f_{CLK}(t)$ of the clock signal at t time is also calculated so as to transmit scan data with nβ beam spots precisely within the effective scanning window.

The control methodology of resonant frequency f and amplitude A of the MEMS mirror by the MEMS scan controller according to the present invention includes the following steps:

S1: set an initial value of duty D and set an initial value of period T;
S2: check the PD signal and whether there are two triggers within a half period; if yes, starts to adjust the frequency, while if not, starts to adjust the amplitude (step S5);
S3: check whether ratio of the time interval between two contiguous triggers of the PD signal to the whole period; If it's over 5%, starts to modify the amplitude. Wherein, the preset 5% deviation can be co-ordinated by the requirements of precision;
S4: while adjusting the amplitude, adjusts (increase or decrease) the value of the duty D so as to make the PD detector be triggered twice within a half-period;
S5: fine tune the frequency after adjusting the amplitude while the frequency is limited in the upper limit.

As to the device with two PD detectors, the method includes the following steps:

S1: set an initial value of duty D and set an initial value of period T;
S2: check the two PD signals and whether there are two triggers within a half period of each one PD detector; if yes, starts to adjust the frequency, while if not, starts to adjust the amplitude (step S5);
S3: check whether ratio of the time interval between two contiguous triggers of the PD signal to the whole period of each PD detector; If it's over 5%, starts to modify the amplitude. Wherein, the preset 5% deviation can be co-ordinated by the requirements of precision;
S4: while adjusting the amplitude, adjusts (increase or decrease) the value of the duty D so as to make the PD detector be triggered twice within a half-period;
S5: fine tune the frequency after adjusting the amplitude while the frequency is limited in the upper limit.

The way to calculate frequency $f_{CLK}(t)$ of the clock signal is as following: after frequency and amplitude of the MEMS mirror becoming stable, the frequency of the MEMS mirror is f, and the sending time of the scan data within the effective scanning window is $T_2$ (or $T_4$). When the number of β or nβ spots are sent within the effective scanning window, the pulse frequency $f_{CLK}$ of the clock signal at t time is:

$$f_{CLK} = n \cdot \beta \cdot \frac{1}{T_2} = n \cdot \beta \cdot f \cdot \frac{\pi}{\sin^{-1}\left(\frac{\theta_n}{\theta_c}\right)} \quad (5)$$

The number of pulse generated in $T_2$ period is $$n\beta \frac{T(t)}{T_2}$$

while a counter comparator generates a half of the number of the pulse—

$$\frac{1}{2} n\beta \frac{T(t)}{T_2},$$

and sent by the clock signal.

The way of sending the scan data includes the following steps:
S1: the MEMS scan controller checks the MEMS mirror in stable then calculates frequency $f_{CLK}$ of the clock signal;
S2: after the MEMS mirror being stable, the MEMS scan controller sends a stable signal to laser controller;
S3: once the laser controller receives the stable signal, the scan data is sent in frequency of $f_{CLK}$.

Thereby, after the oscillation of the MEMS mirror being stable, the MEMS scan controller sends a clock signal with frequency of $f_{CLK}$ so as to transmit scan data within the effective scanning window (in the $T_2$ or $T_4$).

BRIEF DESCRIPTION OF THE DRAWINGS

FIG. 4 shows relationship among PD signal, scanning angle, scanning data and time;

FIG. 5 shows a first modulation signal sent by a MEMS scan controller after the MEMS scan controller receiving signals from a laser controller and a PD detector;

DETAILED DESCRIPTION OF THE PREFERRED EMBODIMENT

Embodiment One

Figure 1:
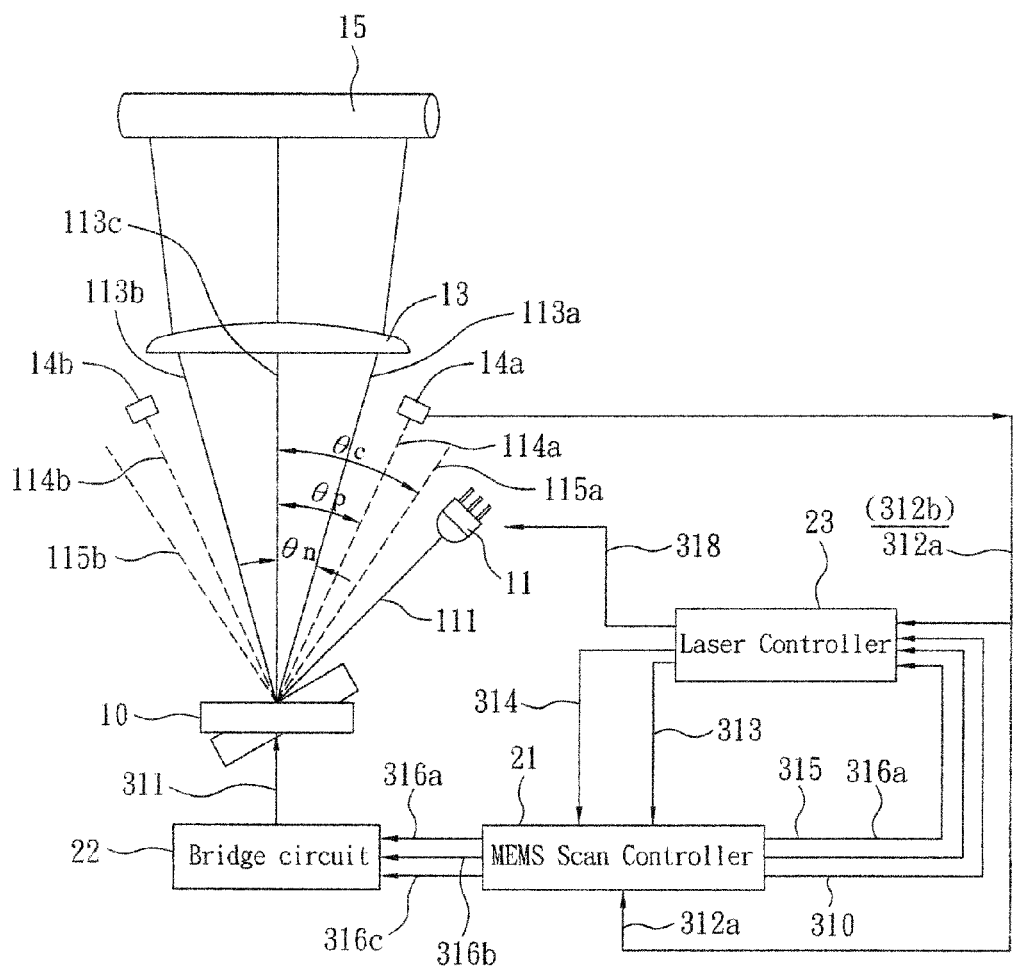
FIG. 1 is a schematic drawing showing an embodiment of a bi-direction laser scanning unit (LSU) according to the present invention.

Refer to FIG. 1, a MEMS LSU with one PD detectors is disclosed. A pre-scan laser 11 is controlled by a laser controller 23. When the laser controller 23 sends out scanning data 318, the pre-scan laser 11 emits laser light 111 toward a MEMS mirror 10 that oscillates in resonant frequency f. In this embodiment, the MEMS mirror 10 whose f=2500±5% HZ and maximum scanning angle±23° is used. The laser light 111 with scanning angle of ±23*2° ($\theta_c$=±23*2°) ranges from right-side scanning beam 115a to left-side scanning beam 115b. The scanning beam ranging from 113a to 113b is within angle of $2\theta_n$. In this embodiment, the $\theta_n$=±19*2°, and is called effective scanning window. A PD detector 14a is disposed at $\theta_p$ while $\theta_p$=±21*2° for detecting scanning beam 114a and converting light into electric trigger signal. The scanning beams 113a-113b pass a post-scan lens 13 and form an image on an object 15 such as a photo conductor. In order to keep stability of the angle $2\theta_c$, the MEMS mirror 10 is controlled by a bridge circuit 22 that sends driving signals 311 for driving the MEMS mirror 10 to oscillate. When the MEMS mirror 10 oscillates over the thresholds, the bridge circuit 22 sends out the driving signals 311. In similar way, when the MEMS mirror 10 oscillation is under the thresholds, the bridge circuit 22 also sends out the driving signals 311. The bridge circuit 22 is controlled by a first modulation signal 316a (Pulse Width Modulation signal(PWM1) a second modulation signal 316b, and a third modulation signal 316c from a MEMS scan controller 21. Moreover, the laser controller 23 is a main controller of laser-printers or multi-function printers. The laser controller 23 sends the scanning data 318 for control of the pre-scan laser 11, the enable (ENB) signals 313 that turns on the MEMS mirror 10, and the adjust signals 314 that adjusts the MEMS mirror 10 so as to check whether the MEMS mirror 10 becomes stable, whether the scanning data 318 can be sent, and in what frequency the scanning data 318 is sent.

After receiving the ENB signal 313 and the adjust signal 314, the MEMS scan controller 21 generates the first modulation signal 316a for modulating frequency, the second modulation signal 316b for modulating frequency, the third modulation signal 316c for modulating amplitude and a stable signal 315 that represents the MEMS mirror 10 has been stable. By the PD signal 312a from the PD detector 14a, the resonant frequency of the MEMS mirror 10 is calculated so as to provide the laser controller 23 a clock(CLK) signal 310 for driving the pre-scan laser 11 timely to send image signal. By calculation and phase of the MEMS scan controller 21, the clock (CLK) signal 310 provided with correct frequency. Thus the scanning beams 113a, 113b from scanning of the laser light 111 are within effective scanning window. That means the scanning beams 113a, 113b generates nβ spots on the object 15.

Figure 2:
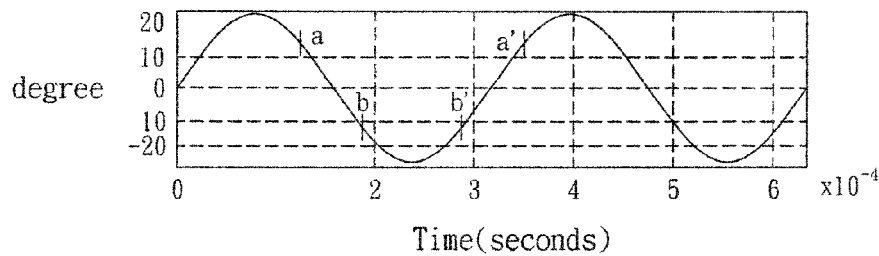
FIG. 2 is a schematic drawing showing relationship between time and angle of the laser beam reflected by a MEMS mirror.

The MEMS scan controller 21 comprises a control logic 211, a D inverter I 212, a D inverter II 213, a phase locked loop (PLL) 214 and a counter comparator 215. The control logic 211 receives trigger PD signals 312a from the PD detector 14a and calculates each PD signal 312a to generate frequency modulation signals (the first modulation signal and the second modulation signal 316a, 316b) and amplitude modulation signals (the third modulation signal 316c). The PLL 214 generates the CLK signal 310. When the laser controller 23 receives the CLK signal 310 from the PLL 214 of the MEMS scan controller 21, the scanning data 318 is sent according to frequency of the CLK signal 310. The details are as followings:

Refer to FIG. 2, the MEMS mirror 10 oscillates around the Y-axis, along the X axis and oscillation angle is $\pm\theta_c$ to the right and left. At any time t, the angle θ(t) between the optical axis 113c and scanning beam from reflection of the laser light 111 is a sinusoid. When the reflected scanning beam triggers the PD detector 14a, a first-time triggered PD signal 312a is generated. When the MEMS mirror 10 oscillates to the right edge with an angle $\theta_c$, the angle θ(t) is maximum. Then the MEMS mirror 10 oscillates back and the angle θ(t) is reduced. When the reflected scanning beam triggers the PD detector 14a, a second-time triggered PD signal 312a is generated. When the scanning beam arrives within the effective scanning window (from 113b to 113a, the point b' to the point a' in FIG. 2), now the relationship between the angle θ(t) and the time t is most close to linear (but it's sinusoid intrinsically). This is the effective scanning window of the forward scanning.

When the MEMS mirror 10 oscillates to the left edge with an angle- $\theta_c$, the angle θ(t) is maximum. Then the MEMS mirror 10 oscillates back and the angle θ(t) is decreased. When the scanning beam arrives within the effective scanning window (from 113a to 113b, the point a to the point b in FIG. 2), this is the effective scanning window of the forward scanning. When the MEMS mirror 10 keeps oscillating to the right and the scanning beam triggers the PD detector 14a, a third-time triggered PD signal 312a is generated and a scan cycle $\pm\theta_c$ is completed. The MEMS mirror 10 oscillates back after arriving the maximum angle $\theta_c$ and the angle θ(t) is decreased. When the scanning light triggers the PD detector 14a, a fourth-time triggered PD signal 312a is generated.

Figure 3:
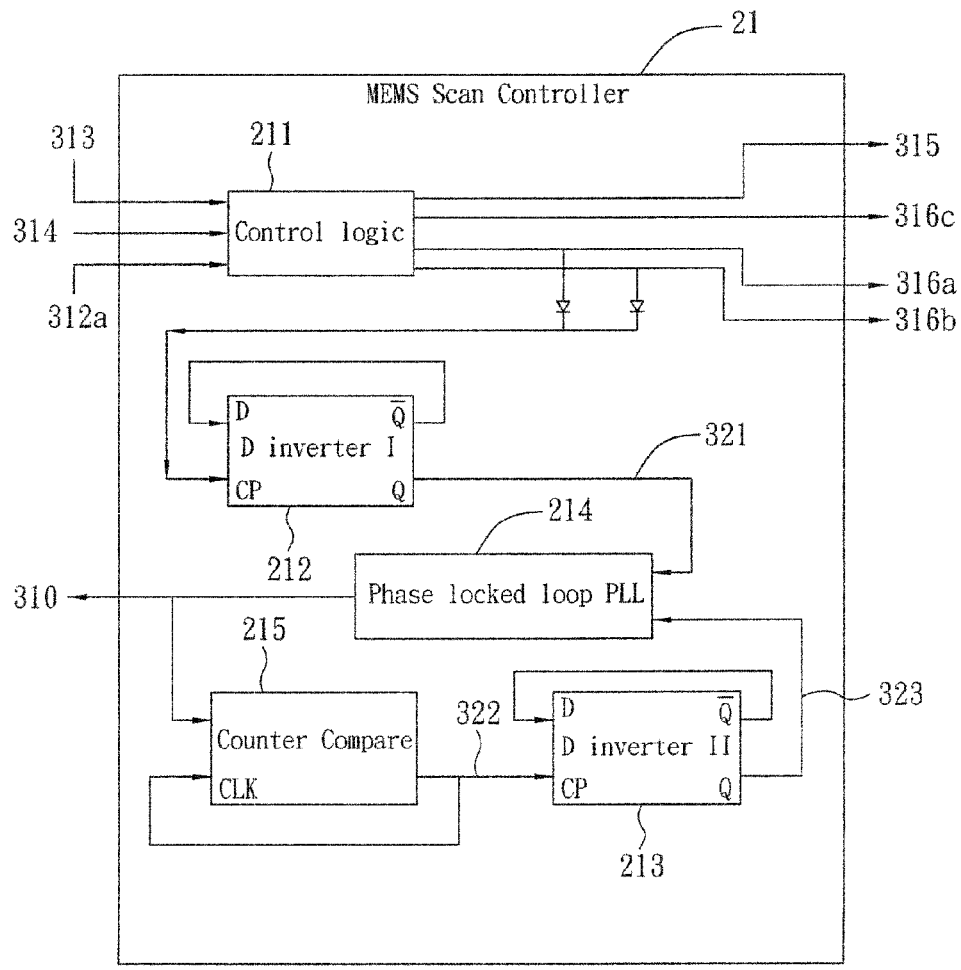
FIG. 3 is a schematic drawing of an embodiment of a MEMS scan controller according to the present invention.

Refer to FIG. 3, the MEMS scan controller 21 in this embodiment is formed by a control logic 211, two D inverters 212/213, a phase locked loop (PLL) 214 and a counter comparator 215. The MEMS scan controller 21 receives the PD signal 312a from the PD detector 14a. The MEMS mirror 10 oscillates at the frequency of f and time of a period from left to right is T(t), and this is called forward scanning and reverse scanning of a scan cycle, as shown in FIG. 4. In a scan cycle, when the θ(t) is reduced from position of the scanning beam 114a, it's delay time $T_1$, now the relationship between the angle θ(t) and the time t is close to linear. The laser controller 23 sends the scanning data 318 and time of sending is $T_2$. This is the effective scanning window of the forward scanning. After the delay time $T_3$, the laser controller 23 sends the scanning data 318 and time of sending is $T_4$. This is the effective scanning window of the reverse scanning. The $T_1$, $T_2$, $T_3$, and $T_4$ are within the same scan period T(t). The relationship among $T_1$, $T_2$, $T_3$, and $T_4$ is as following: when f=2500 HZ, $T_1=1.137\times10^{-5}$, $T_2=T_4=1.2377\times10^{-4}$, $T_3=7.623\times10^{-5}$ (sec) obtained by performing calculation of equation (1) to equation (4).

When the ENB signals 313 from the laser controller 23 is at high voltage, disabling the MEMS mirror 10. When the high voltage turns into low voltage, enabling of the MEMS mirror 10 to start oscillating. Refer to FIG. 5, after enabling of the MEMS mirror 10, the MEMS mirror 10 is not stable, the stable signal 315 from the laser controller 23 is at low voltage and so is the adjust signal 314 from the laser controller 23. After a period of time, MEMS mirror 10 has been stable, the stable signal 315 as well as the adjust signal 314 becomes at high voltage and the first modulation signal 316a is sent. By the control of the bridge circuit 22, the modulation signal 316a becomes into a driving signal 311 so as to make the MEMS mirror 10 oscillates to the left. After the MEMS mirror 10 oscillating forward and reverse, each scan period T(t) triggers two times of PD detector 14a. Thus a trigger period T(t) of the triggered PD signal 312a is obtained by calculation of the control logic 211. While controlling $T_1$, $T_2$, $T_3$, $T_4$, the control logic 211 of the MEMS scan controller 21 receives the triggered PD signals 312a from the PD detector 14a, calculates each triggered PD signal 312a and generates the first modulation signal 316a, the second modulation signal 316b for modulating frequency of the MEMS mirror 10, and the third modulation signal 316c for modulating amplitude of the MEMS mirror 10. After the first, the second and the third modulation signals 316a, 316b, 316c being sent, the bridge circuit 22 receives the modulation signals for adjusting resonant frequency and amplitude of the MEMS mirror 10.

Figure 6:
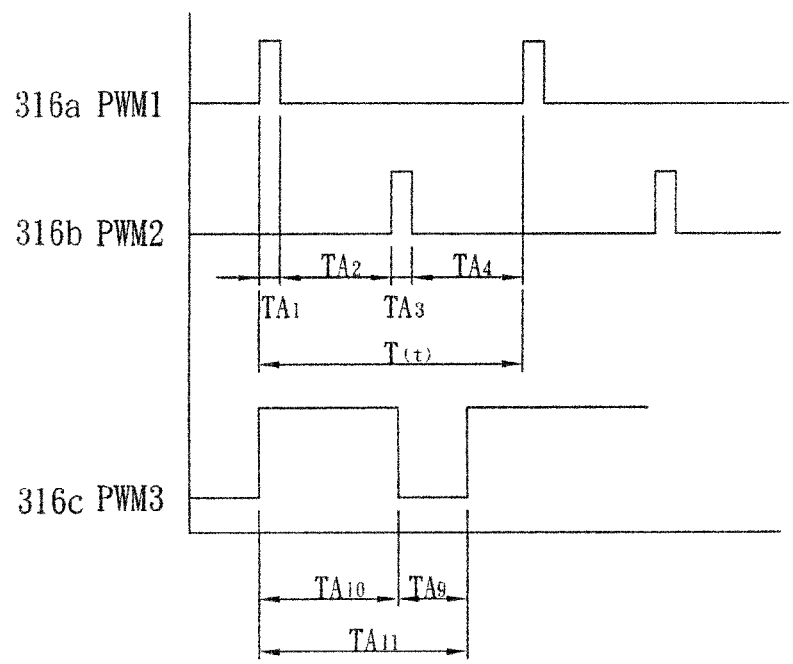
FIG. 6 shows relationship among PWM1 signal, PWM2 signal, and PWM3 signal.
Figure 7:
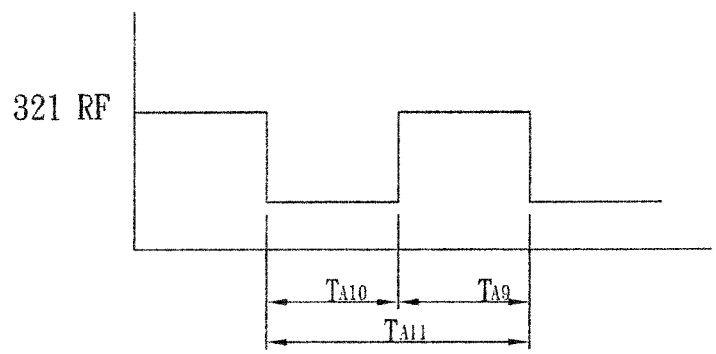
FIG. 7 shows resonant frequency of an embodiment according to the present invention.
Figure 8:
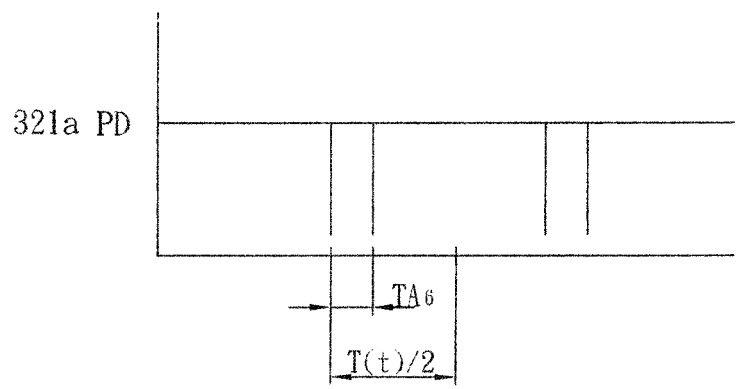
FIG. 8 shows PD signal of the present invention.

Refer to FIG. 6, pulse duty relation of the first, the second and the third modulation signals 316a, 316b, 316c are set as following: inside a resonant period T, pulse duration of the first and the second modulation signals 316a, 316b respectively are $TA_1$ and $TA_3$ while $TA_1$ is set to be equal to $TA_3$ (for this embodiment, not restricted). Time interval of the first and the second modulation signals 316a, 316b respectively are $TA_2$ and $TA_4$ while $TA_2$ is set to be equal to $TA_4$ (for this embodiment, not restricted). Where in one period, is $TA_1+TA_2+TA_3+TA_4=T$. That means within the resonant period T, the first and the second modulation signals 316a, 316b respectively are sent once. Thus the first and the second modulation signals 316a, 316b drive the MEMS mirror 10 to oscillate with resonant frequency of 1/T. There is no restriction on $TA_1/TA_4$ ratio and the ratio varies according to control loops. In this embodiment, $TA_1/TA_4=1/4$. The third modulation signal 316c changes from high voltage to low voltage. The ratio between high-potential time $TA_{10}$ and high-potential time $TA_9$ is duty D of amplitude adjustment. If frequency of the third modulation signal 316c is set as 1K (in this embodiment, generally the frequency is not limited) thus, $TA_{11}=1/1000$, $D=TA_{10}/TA_{11}$, $TA_9+TA_{10}=TA_{11}$. By adjusting value of D, the waveform of the third modulation signal 316c can be modified. Thus the amplitude of the MEMS mirror 10 is changed through the bridge circuit 22. After reflecting the laser light 111, the MEMS mirror 10 oscillates from the left to the right and triggers the PD detector 14a twice. After the MEMS mirror 10 reflecting the laser light 111, the MEMS mirror 10 oscillates from the left side to right side and triggers the PD detector 14a twice again. Refer to FIG. 8 the time interval between two contiguous triggers of the PD detector 14a is $TA_6$ and it's ratio to T(t) is $TA_6/(T(t)/2)$. The period T(t) changes over time so that the ratio $TA_6/(T(t)/2)$ also changes over time. The PD detector 14a is fixed in a certain position and the angle between the scanning beam 114a that triggers the PD detector 14a and the optical axis is $\theta_p$ while maximum scanning angle of the MEMS mirror 10 is $\theta_c$. When the period is T, 'R=$TA_6/(T/2)$. According to the change of the ratio R, the change of the period T is obtained. The equation is as the following:

$$R = \frac{TA_6}{\frac{1}{2}T} = \frac{1}{2\pi}\left(2\sin^{-1}\left(\frac{\theta_p}{\theta_c}\right)\right) \quad (6)$$

Figure 10:
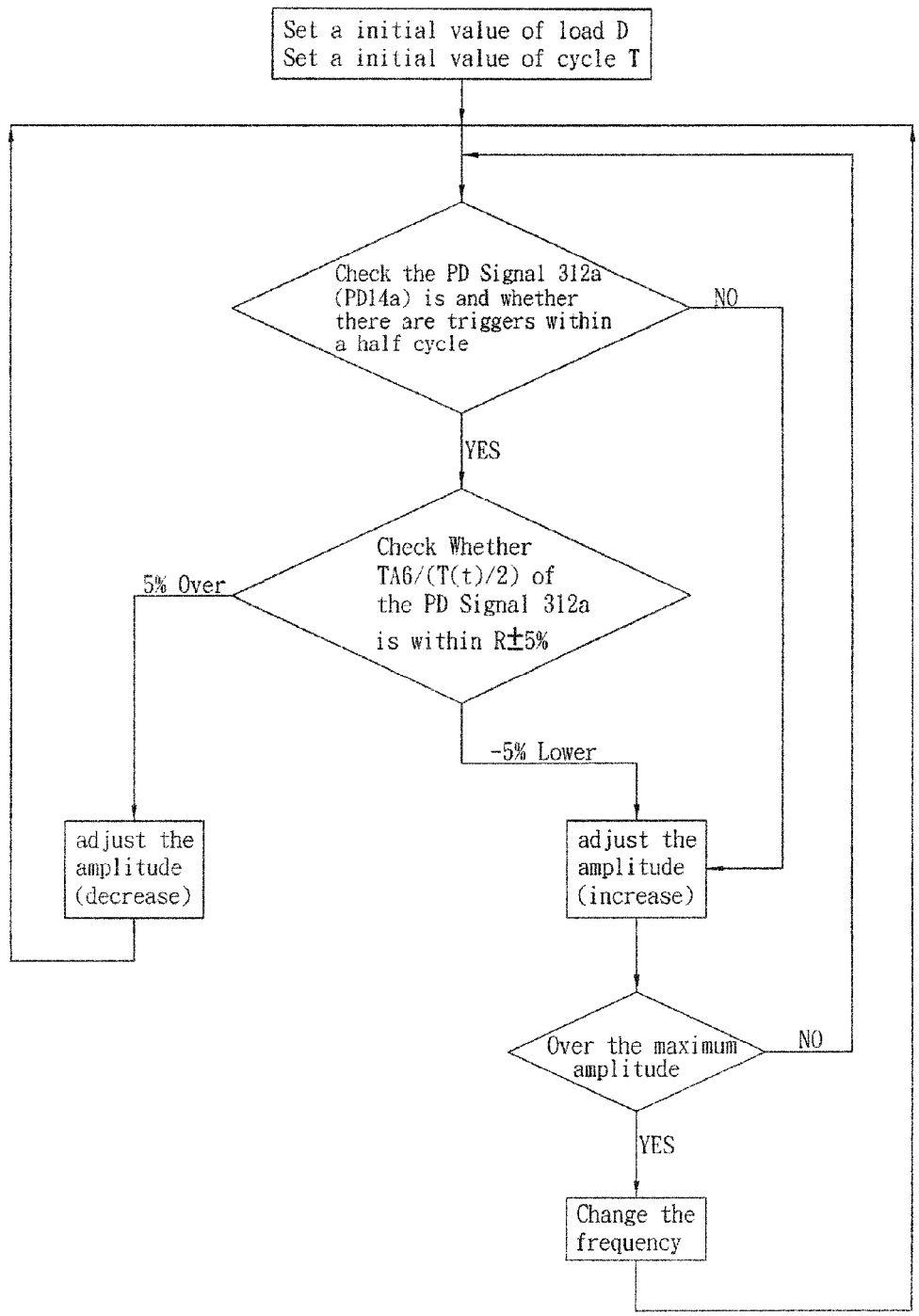
FIG. 10 is a flow chart of a MEMS scan controller according to the present invention.

Because the MEMS mirror 10 oscillates by means of electromagnetic force or spring force, its resonant frequency f(t) and amplitude A(t) at any time t are not fixed values. The lower limit of the resonant frequency is $f_L$, and the upper limit of the frequency is $f_H$ so that $f_L \leq f(t) \leq f_H$. In this embodiment, $f_L=2375$, $f_H=2625$. The MEMS mirror 10 oscillation is affected by environment or its structure so that the change of the resonant frequency f(t) will have effect on timing of sending scanning data while the change of the amplitude A(t) will affect the reflection angle θ(t) and further affect the effective scanning window formed by the scanning beam 113a 113b. Therefore, the way of the MEMS scan controller 21 to control the resonant frequency f(t) as well as the amplitude A(t) of the MEMS mirror 10 includes the following steps, as shown in FIG. 10:

S1: set a initial value of the duty D ( in this embodiment, D=90%) set initial value of the period T (in this embodiment, $T=1/f_L=4.21\times10^{-4}$ sec), and make the pre-scan laser 11 emit laser light 111 under the control of the laser controller 23;

S2: check the PD signal 312a is and whether there are two triggers within a half period (the period is $4.21\times10^{-4}$ sec);

S3: set the first modulation signal 316a, the second modulation signal 316b and the third modulation signal 31c at low voltage for frequency adjustment;

S4: check whether the trigger time ratio $TA_6/(T(t)/2)$ of the PD signal 312a is within R±5%. Once $TA_6/(T(t)/2)$ is within the range, check whether it's continuous stable. If yes, the laser controller 23 sends the stable signal 315. If $TA_6/(T(t)/2)$ is not within the range, starts to adjust the amplitude.

S5: before adjusting the amplitude, check the ratio $TA_6/(T(t)/2)$ is within the upper limit (+5%) and the lower limit (-5%)

S6: adjust the value of the duty D for changing the amplitude so as to make the PD detector 14a can be triggered twice within the half-period;

S7: fine tune the frequency after adjusting the amplitude and the frequency is no more than $f_H$.

In this embodiment, the PD detector 14a is disposed at the angle $\theta_p=21°$. When f=2500 HZ, it is got from the Eq.(5): R=0.26745. When the laser controller 23 adjusts resonant frequency f(t) as well as the amplitude A(t) of the MEMS mirror 10 and checks the trigger time ratio $TA_6/(T(t)/2)$ of the PD signal 312a, R ranges from lower limit 0.25408 to upper limit 0.28082 (R=0.25408~0.28082).

After adjusting the frequency T(t) and the amplitude A(t) of the MEMS mirror 10, and the laser controller 23 sending the stable signal 315, scan data 318 is going to be transmitted.

The MEMS scan controller 21 further comprises: at least one D inverter I 212, at least one inverter II 213. The D inverter I 212 and the D inverter II 213 receive the frequency modulation signals, the first modulation signal 316a and the second modulation signal 316b, from the control logic 211 and generates a resonant frequency signal 321 as well as feedback signal.

Figure 9:
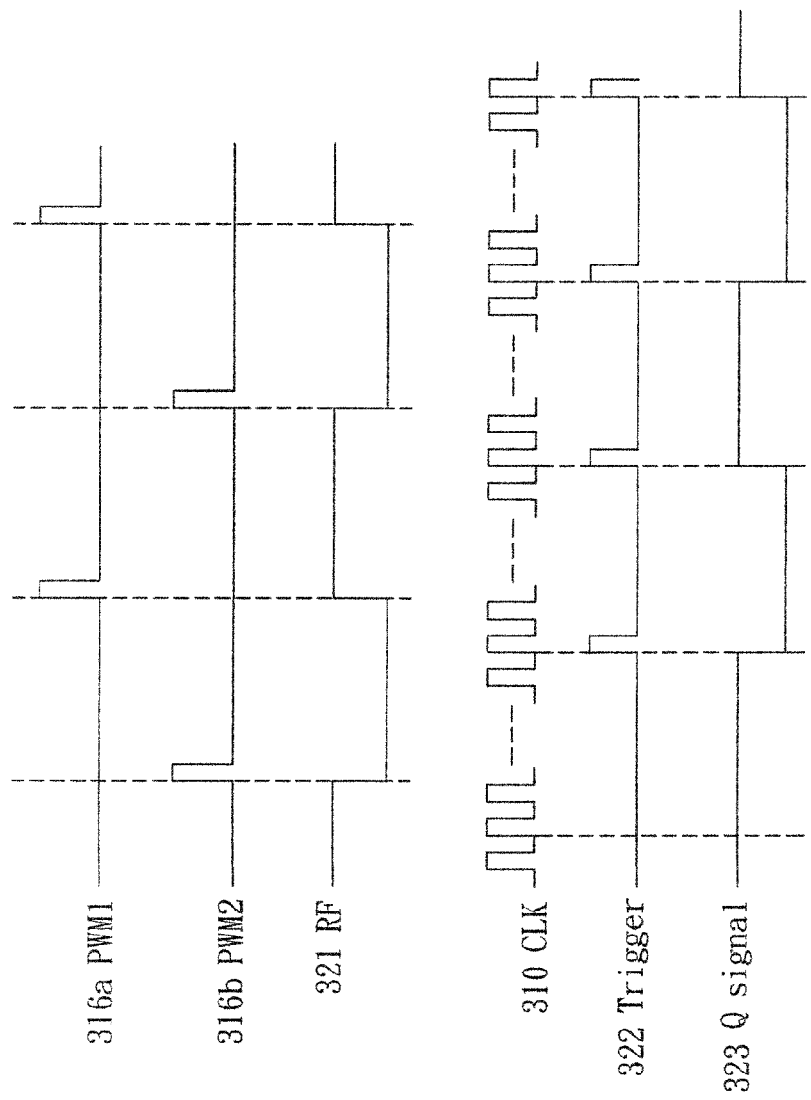
FIG. 9 shows relationship among various signals of the present invention.

Or after receiving trigger signals 322 from the counter comparator 215, the D inverter 212/213 generates internal oscillation Q signal as well as feedback signal. The low voltage time $T_{12}$ and high voltage time $T_{13}$ of the resonant frequency signal 321 are shown in FIG. 9. The phase locked loop 214 receives the resonant frequency signals 321 and/or internal oscillator signals 323, feedback signals from the D inverter and then generates the CLK signal 310. The CLK signal 310 depends on the $T_{12}/T_{13}$ ratio of the resonant frequency signal 321. nβ pulse is generated within a half period. The counter comparator 215 receives the CLK signal 310 from the phase locked loop 214 while the CLK signal 310 is a pulse with f(t) frequency. After accumulating pulses of the CLK signal 310 to a certain number, the counter comparator 215 generates a trigger signal 322 and deletes the accumulated CLK signal 310, reset for next feedback.

When frequency and amplitude of the MEMS mirror 10 have become stable, the transmitting time of the scan data 318 within the effective scan window is $T_2$ (or $T_4$) with frequency of f(t) at time t. nβ=1*5102 spots should be sent within the effective scan window, as shown in FIG. 9. At this moment (time t), pulse frequency of the CLK signal 310 is $f_{CLK}(t)$. At t time and the frequency of the MEMS mirror 10 is 2500 HZ, $f_{CLK}$=41.22 MHZ is got from Eq.(4). The counter comparator 215 generates 8244 pulses within $T_2$.

Figure 11:
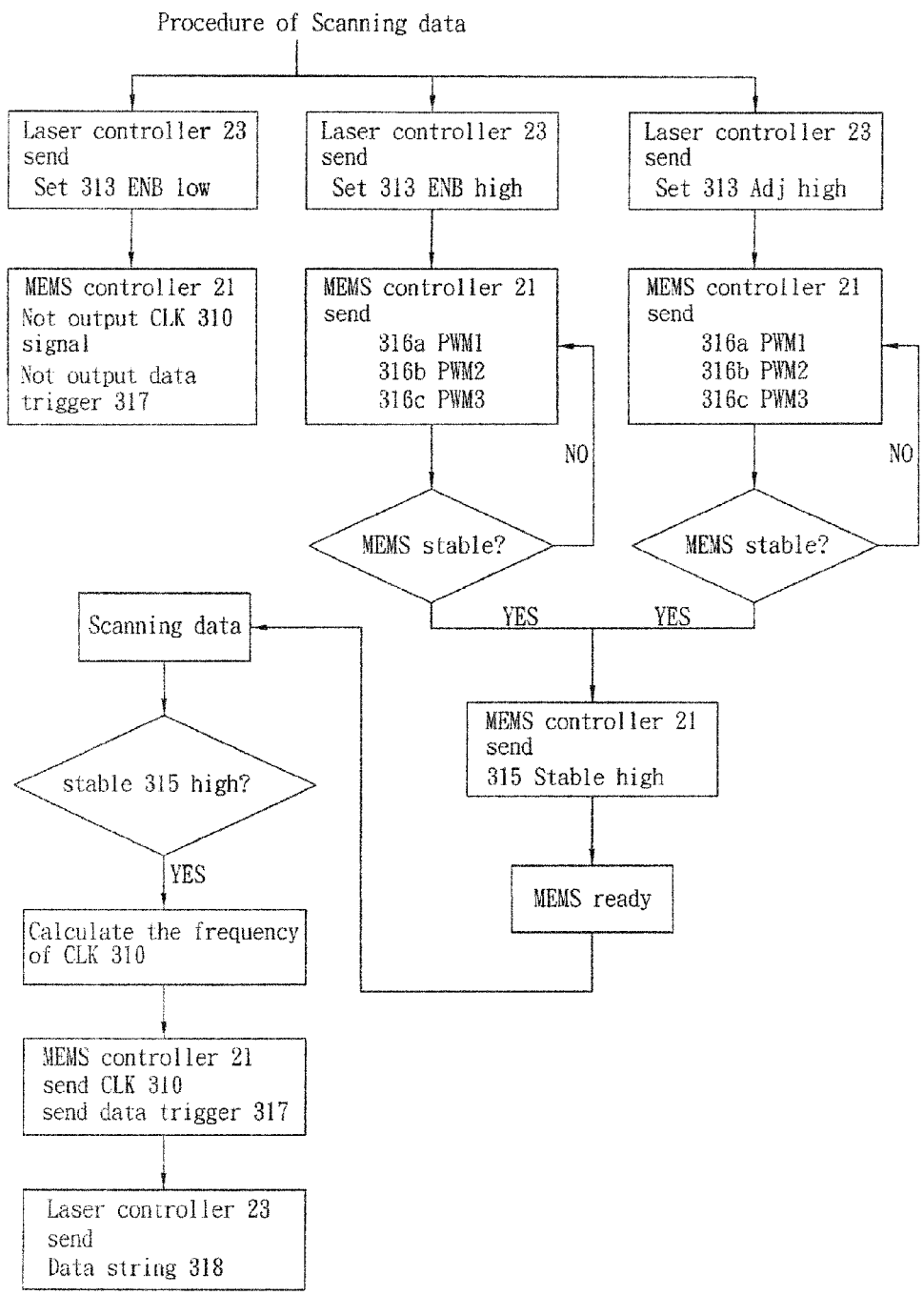
FIG. 11 is a flow chart showing transmission procedures of scanning data according to the present invention.

After frequency T(t) and amplitude A(t) of the MEMS mirror 10 being stable, the laser controller 23 starts to sending scan data and the way of sending scan data includes the following steps, as shown in FIG. 11:

S1: if the ENB signal 313 from the laser controller 23 is at low voltage, the MEMS scan controller 21 will not output the CLK signal 310 and the data trigger signal 317a. Once the laser controller 23 outputs the ENB signal 313 or the adjust signal 314, the MEMS scan controller 21 sends the first, the second and the third modulation signals 316a, 316b, 316c for adjusting and checking whether the MEMS mirror 10 becomes stable; now start-up procedure of the MEMS mirror 10 is completed;

S2: the MEMS scan controller 21 sends a stable signal 315 after the MEMS mirror 10 being stable;

S3: the MEMS scan controller 21 sends a clock signal 310 whose frequency $f_{CLK}(t)$ is calculated by Eq.(5);

S4: the laser controller 23 sends the scan data 318 with the frequency $f_{CLK}(t)$ of the clock signal 310.

The frequency $f_{CLK}(t)$ of the clock signal 310 is determined by the MEMS scan controller 21 according to the resonant frequency f(t) of the MEMS mirror 10 at any time t. Thus the laser controller 23 sends the scan data 318 according to this frequency ($f_{CLK}(t)$) and the number of β or nβ beam spots are sent in a $T_2$ or $T_4$ period. The present invention provides a MEMS scan controller 21 that sends the clock signal 310 with frequency of $f_{CLK}(t)$, after oscillation of the MEMS mirror 10 becoming stable so as to send the scan data 318 within the effective scan window in the $T_2$ or $T_4$.

Embodiment Two

Figure 12:
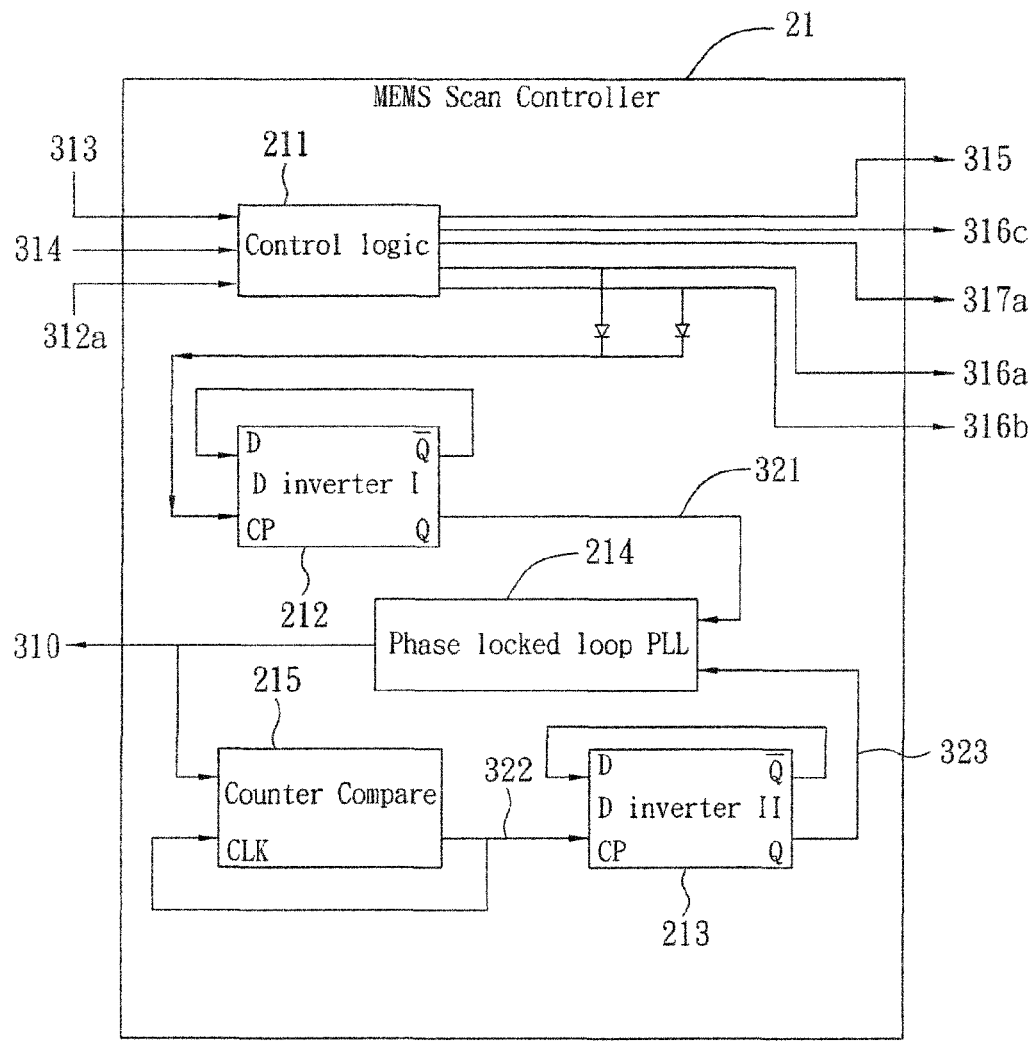
FIG. 12 is another embodiment of the MEMS scan controller according to the present invention.

This embodiment is applied to a MEMS LSU with a PD detector. The control method of the MEMS scan controller 21 according to this embodiment is the same with that of the above embodiment. In order to send the scan data 318 more precisely, when the MEMS scan controller 21 sends the clock signal 310 with frequency of $f_{CLK}(t)$, the data trigger signal 317a is also sent simultaneously thereby for driving the laser controller 23 to start sending the scan data 318. Refer to FIG. 12, once the control logic 211 of the MEMS scan controller 21 receives the ENB signal 313, it sends the clock signal 310 as well as the data trigger signal 317a. The method of this embodiment to send the scan data includes following steps:

S1: if the ENB signal 313 from the laser controller 23 is at low voltage, the MEMS scan controller 21 will not send the CLK signal 310 as well as the data trigger signal 317a. Once the laser controller 23 sends the ENB signal 313 or the adjust signal 314, the MEMS scan controller 21 sends the first, the second and the third modulation signals 316a, 316b, 316c for adjusting and checking whether the MEMS mirror 10 becomes stable; now start-up (setting) procedure of the MEMS mirror 10 is completed;

S2: the MEMS scan controller 21 sends a stable signal 315 after the MEMS mirror 10 being stable;

S3: the MEMS scan controller 21 sends a clock signal 310 and a data trigger signal 317a; the frequency $f_{CLK}(t)$ of the clock signal 310 is calculated from Eq.(5);

S4: while receiving the data trigger signal 317a, the laser controller 23 sends the scan data 318 with the frequency $f_{CLK}(t)$ of the clock signal 310.

The Embodiment Three

Figure 13:
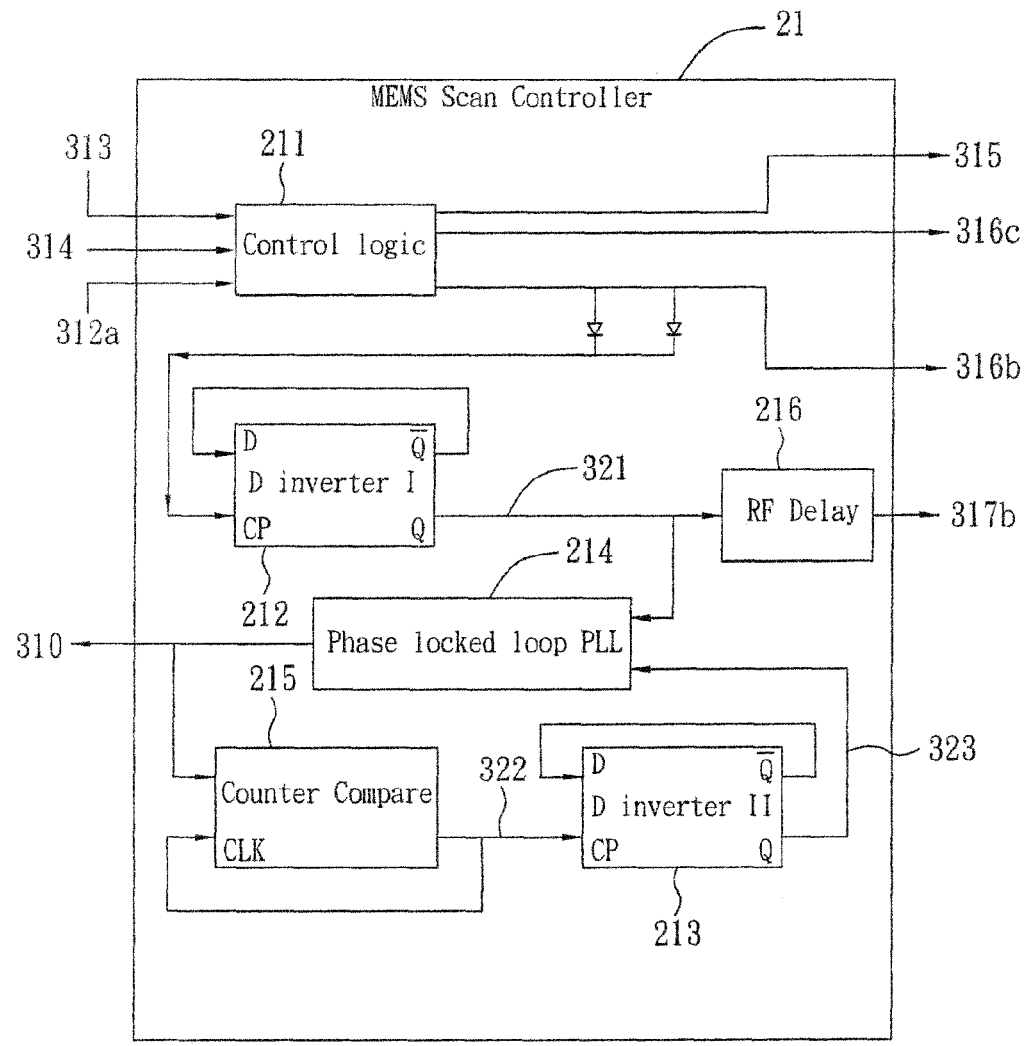
FIG. 13 is a further embodiment of the MEMS scan controller according to the present invention.

This embodiment is applied to a MEMS LSU with a PD detector. The control method of the MEMS scan controller 21 according to this embodiment is the same with that of the first embodiment. The MEMS scan controller 21 of this embodiment further comprises a RF delay circuit 216 that delays the input resonant frequency signal 321 and not sending the data trigger signal 317b until generation of pulse of the first modulation signal 316a. The data trigger signal 317b drivers the laser controller 23 starting to send the scan data 318. As shown in FIG. 13, once the control logic 211 of the MEMS scan controller 21 receives the stable signal 315, it sends the clock signal 310 as well as the data trigger signal 317a. The method of this embodiment to send the scan data includes following steps:

S1: if the ENB signal 313 from the laser controller 23 is at low voltage, the MEMS scan controller 21 will not send the CLK signal 310 as well as the data trigger signal 317b. Once the laser controller 23 sends the ENB signal 313 or the adjust signal 314, the MEMS scan controller 21 sends the first, the second and the third modulation signals 316a, 316b, 316c for adjusting and checking whether the MEMS mirror 10 becomes stable; now the star-up procedure of the MEMS mirror 10 is completed;

S2: the MEMS scan controller 21 sends a stable signal 315 after the MEMS mirror 10 being stable;

S3: the MEMS scan controller 21 sends a clock signal 310 and a data trigger signal 317b while the frequency $f_{CLK}(t)$ of the clock signal 310 is calculated from Eq.(5);

S4: while receiving the data trigger signal 317b, the laser controller 23 sends the scan data 318 with the frequency $f_{CLK}(t)$ of the clock signal 310.

Embodiment Four

Figure 14:
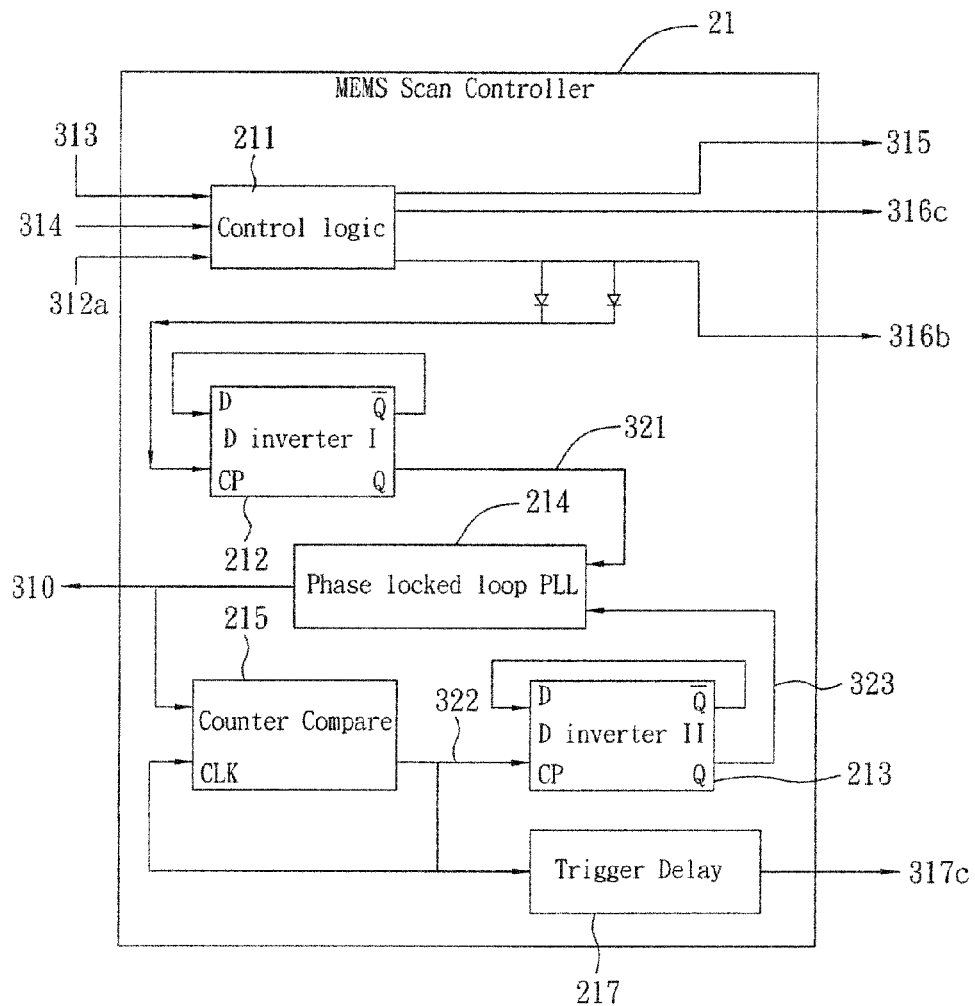
FIG. 14 is a further embodiment of the MEMS scan controller according to the present invention.
Figure 15:
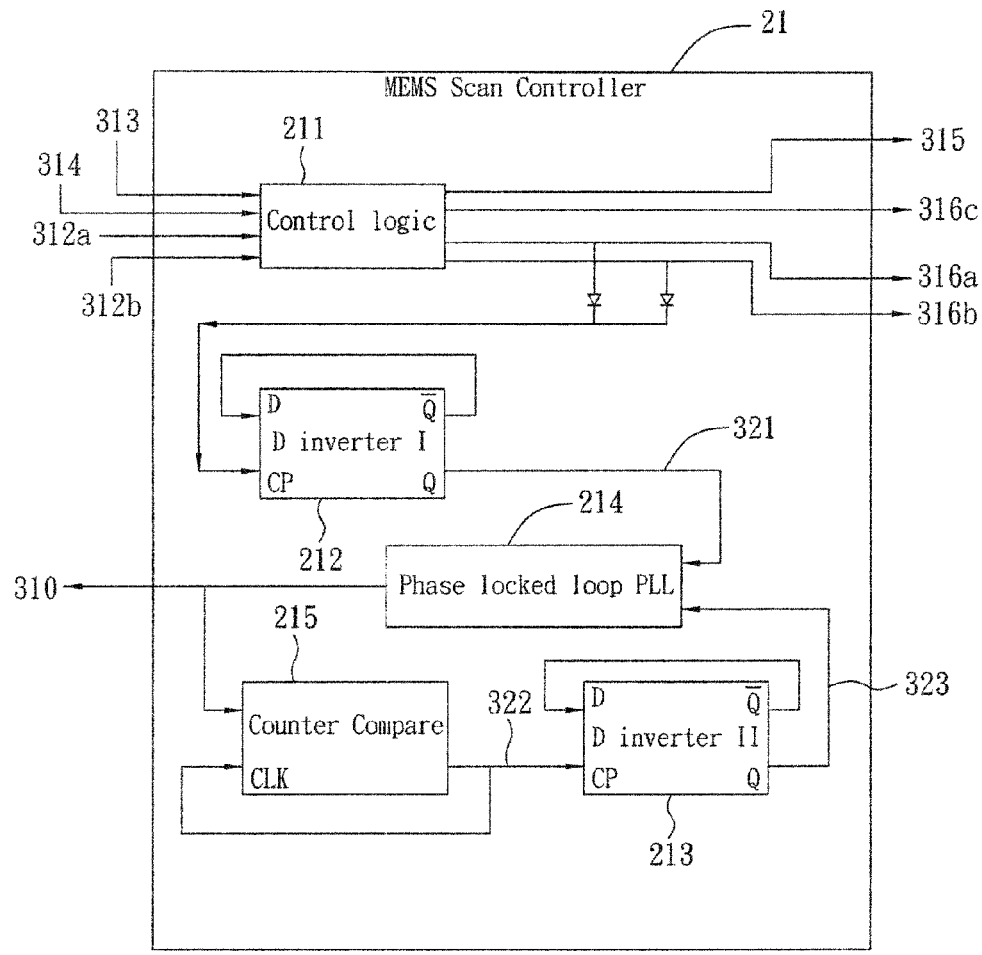
FIG. 15 is a further embodiment of the MEMS scan controller according to the present invention.

This embodiment is applied to a MEMS LSU with a PD detector. The control method of the MEMS scan controller 21 according to this embodiment is the same with that of the first embodiment. The MEMS scan controller 21 of this embodiment further comprises a data trigger delay circuit 217 that sends the input resonant frequency signal 321 when pulse of the first modulation signal 316a generates. In order to send the scan data 318 more precisely, when the MEMS scan controller 21 sends the clock signal 310 with frequency of $f_{CLK}(t)$, the data trigger signal 317c is sent simultaneously by the data trigger delay circuit 217 so as to drive the laser controller 23 starting transmission of the scan data 318. Refer to FIG. 14, once the control logic 211 of the MEMS scan controller 21 receives the stable signal 315, it sends the clock signal 310 as well as the data trigger signal 317c. The method of this embodiment to send the scan data comprises following steps:

S1: if the ENB signal 313 from the laser controller 23 is at low voltage, the MEMS scan controller 21 will not send the CLK signal 310 as well as the data trigger signal 317c. Once the laser controller 23 sends the ENB signal 313 or the adjust signal 314, the MEMS scan controller 21 sends the first, the second and the third modulation signals 316a, 316b, 316c for adjusting and checking whether the MEMS mirror 10 becomes stable; the start-up procedure of the MEMS mirror 10 is completed at this moment;

S2: the MEMS scan controller 21 sends a stable signal 315 after the MEMS mirror 10 being stable;

S3: the MEMS scan controller 21 sends a clock signal 310 and a data trigger signal 317c while the frequency $f_{CLK}(t)$ of the clock signal 310 is got from Eq.(5);

S4: while receiving the data trigger signal 317c, the laser controller 23 sends the scan data 318 with the frequency $f_{CLK}(t)$ of the clock signal 310.

Embodiment Five

This embodiment is applied to a MEMS LSU with two PD detectors. As shown in FIG. 1, the other PD detector 14b is disposed at the position of θp=−21°. In this embodiment, the MEMS mirror 10 has the frequency of 2500±5% HZ(f=2500±5% HZ) and maximum scanning angle of ±23°. The MEMS scan controller 21 receives the ENB signal 313 from the laser controller 23, the adjust signal 314, the first, the second and the third modulation signals 316a, 316b, 316c from the laser controller 23. The resonant frequency of the MEMS mirror 10 is detected by the PD signals 312a, 312b from the PD detectors 14a, 14b so as to generate the clock signal 319 that is provided to the laser controller 23 for driving the pre-scan laser 11 timely. Thus the scan beam 113a-113b after scanning of the laser light 111 is within the effective scanning window even the scanning beam 113a-113b generates a number of nβ=5102 (when n=1) beam spots on the object 15.

The MEMS scan controller 21 comprises a control logic 211, D inverter I 212, D converter II 213, a phase locked loop (PLL) 214 and a counter comparator 215. The control logic 211 receives triggering PD signals 312a from the PD detector 14a (and PD signals 312b from the PD detector 14b, not showing in FIG. 1) and calculates each PD signal 312a, 312b from the PD detectors 14a, 14b to generate frequency modulation signals (the first modulation signal and the second modulation signal 316a, 316b) and amplitude modulation signals (the third modulation signal 316c) for the MEMS mirror 10. The PLL 214 generates the CLK signal 310. When the laser controller 23 receives the CLK signal 310 from the PLL 214 of the MEMS scan controller 21, the scanning data 318 is sent according to this CLK signal 310.

When the MEMS mirror 10 oscillates forward and backward, in each scan period T(t), the scan beam 114a triggers the PD detector 14a twice (the scan beam 114b triggers the PD detector 14b twice). Thus the trigger period T(t) of the PD signal 312a, 312b is obtained by the control logic 211. While controlling $T_1, T_2, T_3, T_4$, the control logic 211 of the MEMS scan controller 21 receives the PD signal 312a from the PD detector 14a and the PD signal 312b from the PD detector 14b, calculates each trigger PD signal 312a, 312b and generates the first modulation signal 316a, the second modulation signal 316b and the third modulation signal 316c of the MEMS mirror 10. After the first, the second and the third modulation signals 316a, 316b, 316c being sent, the bridge circuit 22 receives the modulation signals for adjusting resonant frequency and amplitude of the MEMS mirror 10.

Figure 16:
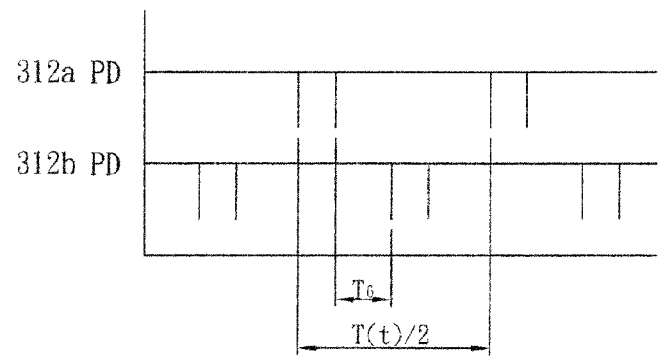
FIG. 16 shows relationship between two PD signals of the embodiment in FIG. 15.

After the MEMS mirror 10 reflecting the laser light 111, the MEMS mirror 10 oscillates from the left side to the right side and triggers the PD detector 14a as well as the PD detector 14b twice. Refer to FIG. 16, the time interval between the second triggering of the two contiguous triggers of the PD detector 14a and the first triggering of the PD detector 14b is $TA_6$ and it's ratio to T(t) is $TA_6/(T(t)/2)$. The period T(t) changes over time so that the ratio $TA_6/(T(t)/2)$ also changes over time. The PD detector 14a (14b) is fixed in a certain position and the angle between the scanning beam 114a that triggers the PD detector 14a and the optical axis is $\theta_p$ while maximum scanning angle of the MEMS mirror 10 is $\theta_c$. When the cycle is T(t), $R=TA_6/(T(t)/2)$. Or by calculation of change of the ratio R, the change of the period T is also obtained. The calculation is as following:

$$TA_6(t) = \frac{T(t)}{2\pi}\left(2\pi\sin^{-1}\left(\frac{\theta_p}{\theta_c}\right)\right) \quad (7)$$

$$R = \frac{TA_6}{\frac{1}{2}T}$$

the same as (6)

The method of the MEMS scan controller 21 to control resonant frequency f(t) and amplitude A(t) of the MEMS mirror 10 is the same with the first embodiment, as shown in FIG. 10. In this embodiment, the PD detector 14a and the PD detector 14b are disposed at the position the angle $\theta_p=21°$. When f=2500 HZ, it is calculated from the Eq.(7): $TA_6=1.4651\times10^{-4}$ sec R=0.73255. When the laser controller 23 controls resonant frequency f(t) as well as the amplitude A(t) of the MEMS mirror 10, the trigger time ratio $TA_6/(T(t)/2)$ of the PD signal 312a (312b) is checked and R ranges from 0.17398 to 0.19230 (R=0.17398~0.19230).

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A Micro-electronic-mechanical System (MEMS) scan controller generating clock frequency applied to a laser scanning unit (LSU) included a laser source emitting laser light, a MEMS mirror driving the laser light scanning an object forwardly or reversely in resonant way, a photoelectric detector (PD detector) receiving scanning beam and turning the light into PD signals, a bridge circuit for control of the MEMS mirror, and a laser controller that controls the laser source to emit laser light; comprising:
- a control logic, at least one D inverter, a phase locked loop and a counter comparator, the MEMS scan controller detecting resonant frequency of the MEMS mirror and generating a clock signal that drives the laser controller for emitting laser light and scanning by the MEMS mirror;

wherein,
the control logic receiving a PD signal from the PD detector and calculating the time interval of each PD signal so as to generate frequency modulation signals, amplitude modulation signals, and stable signals of the MEMS mirror;

wherein,
the D inverter receiving the frequency modulation signals as well as amplitude modulation signals from the control logic and generating resonant frequency signals as well as feedback signals;

wherein,
the phase locked loop receiving the resonant frequency signals from the D inverter and generating clock signals;

wherein,
the counter comparator receiving the clock signals from the phase locked loop and accumulating pulses of the clock signals;

said MEMS scan controller being configured so that the clock signals are provided to laser controller to scan data within an effective scanning window.

2. The device as claimed in claim 1, wherein the control logic further sends data trigger signals that drive the laser controller starting transmission of the scan data.

3. The device as claimed in claim 1, wherein the MEMS scan controller further comprising a RF delay circuit that delays resonant frequency signal from the D inverter and sends a data trigger signal to drive the laser controller to start sending the scan data.

4. The device as claimed in claim 1, wherein the MEMS scan controller further comprising a data trigger delay circuit that delay the resonant frequency signal from the D inverter and sends a data trigger signal to drive the laser controller to start sending the scan data.

5. A Micro-electronic-mechanical System (MEMS) scan controller generating clock frequency applied to a laser scanning unit (LSU) included a laser source emitting laser light, a MEMS mirror driving the laser light scanning an object forwardly or reversely in resonant way, at least two photoelectric detectors (PD detectors) receiving scanning beam and turning the light into PD signals, a bridge circuit for control of the MEMS mirror, and a laser controller that controls the laser source to emit laser light; comprising:
- a control logic, at least one D inverter, a phase locked loop and a counter comparator; the MEMS scan controller detecting resonant frequency of the MEMS mirror and generating a clock signal that drives the laser controller for emitting laser light and scanning by the MEMS mirror;

wherein,
the control logic receiving a photo detector(PD) signal from the PD detectors and calculating the time interval of each PD signal so as to generate frequency modulation signals, amplitude modulation signals and stable signals of the MEMS mirror;

wherein,
the D inverter receiving the frequency modulation signals as well as amplitude modulation signals from the control logic and generating resonant frequency signals as well as feedback signals;

wherein,
the phase locked loop receiving the resonant frequency signals from the D inverter and generating clock signals;

wherein,
the counter comparator receiving the clock signals from the phase locked loop and accumulating pulses of the clock signals;

said MEMS scan controller being configured so that the clock signals are provided to laser controller to scan data within an effective scanning window.

6. The device as claimed in claim 5, wherein the control logic further sends data trigger signals that drive the laser controller starting transmission of the scan data.

7. The device as claimed in claim 5, wherein the MEMS scan controller further comprising a RF delay circuit that delays resonant frequency signal from the D inverter and sends a data trigger signal to drive the laser controller to start sending the scan data.

8. The device as claimed in claim 5, wherein the MEMS scan controller further comprising a data trigger delay circuit that delays the resonant frequency signal from the D inverter and sends a data trigger signal to drive the laser controller to start sending the scan data.

9. A control method of Micro-electronic-mechanical System (MEMS) scan controllers generating clock frequency comprising the steps of:
- S1: checking whether a laser controller sent an enable signal; if the enable signal is sent, the MEMS scan controller starts to calculate scanning frequency and scanning amplitude;
- S2: the MEMS scan controller sending a modulation signal for adjusting scanning frequency and a modulation signal for adjusting scanning amplitude to a bridge circuit so as to stabilize oscillation of a MEMS mirror;
- S3: the laser controller sending a stable signal after the MEMS mirror being stable;
- S4: after receiving the stable signal from the laser controller, the MEMS scan controller calculating resonant frequency of the MEMS mirror and sending a clock signal with frequency $f_{CLK}$:

$$f_{CLK} = n \cdot \beta \cdot f \cdot \frac{\pi}{\sin^{-1}\left(\frac{\theta_n}{\theta_c}\right)}$$

Wherein, $f_{CLK}$ is frequency of the clock signal, f is resonant frequency of the MEMS mirror, nβ is the number of beam spots generated within the effective scanning window in one line, $\theta_c$ is half of scanning angle of the MEMS mirror, $\theta_n$ is half of an angle of the effective scanning window.

* * * * *